United States Patent [19]

Sebba

[11] 3,900,420

[45] Aug. 19, 1975

[54] MICROGAS EMULSIONS AND METHOD OF FORMING SAME

[76] Inventor: Felix Sebba, c/o Department of Chemistry, University of the Witwatersrand, Jan Smuts Ave., Johannesburg, South Africa

[22] Filed: Sept. 14, 1972

[21] Appl. No.: 289,142

Related U.S. Application Data

[63] Continuation-in-part of Ser. No. 38,347, May 18, 1970, abandoned.

[52] U.S. Cl. .................. 252/307; 195/102; 210/63; 252/3; 252/8; 252/8.05; 252/314; 260/2.5 B; 261/116; 261/DIG. 26; 261/DIG. 54
[51] Int. Cl.² .......................................... B01J 13/00
[58] Field of Search ..... 252/307; 261/116, DIG. 26, 261/DIG. 54

[56] References Cited
UNITED STATES PATENTS

| | | | |
|---|---|---|---|
| 1,782,383 | 11/1930 | Greider | 252/307 UX |
| 2,010,661 | 8/1935 | French | 252/307 |
| 3,334,052 | 8/1967 | Kurz et al. | 252/316 |

OTHER PUBLICATIONS

Chang et al., "Bubble Size and Bubble Size Determination," Industrial & Engineering Chemistry, Vol. 48, No. 11, Nov. 1956, pages 2035-2039, (TP 1 A58).

Primary Examiner—Richard D. Lovering
Attorney, Agent, or Firm—Reising, Ethington & Perry

[57] ABSTRACT

A microgas emulsion is disclosed behaving like a Newtonian liquid and consisting essentially of a fine dispersion of gas bubbles, substantially all of which are of colloidal dimensions, in a continuous liquid phase containing a soluble emulsifier in an amount sufficient to lower the surface tension of the liquid to a level at which the gas bubbles are stabilized. A process for producing these emulsions is provided by creating a region of low pressure in a flow of liquid containing the emulsifier and introducing gas into that region.

12 Claims, 1 Drawing Figure

PATENTED AUG 19 1975
3,900,420
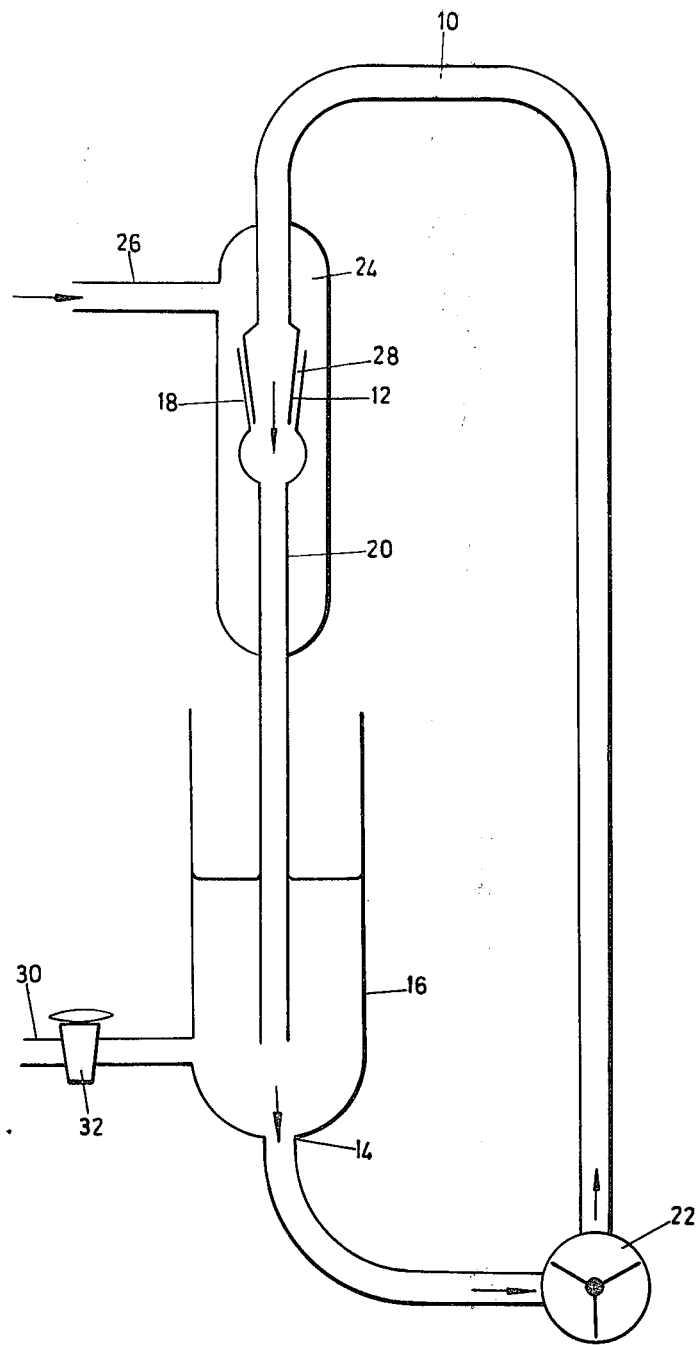

MICROGAS EMULSIONS AND METHOD OF FORMING SAME

This application is a continuation-in-part application of my application Ser. No. 38,347, filed May 18, 1970 and now abandoned.

The invention covered by Ser. No. 38,347, filed May 18, 1970 and now abandoned, relates to products which were called "microfoams" and which consist essentially of a dispersion of gas bubbles, substantially all of which are of colloidal dimensions, in a liquid medium. The term "microfoam" used was based on the definition of a foam as being a discontinuous dispersion of a gas in a continuous liquid medium and the invented product conforms to that definition. However, it has now become clear that such a definition of a foam is not precise enough and a more correct definition of a foam is that it is a system made up of discontinuous bubbles of a gas encapsulated in a thin shell of a liquid and held together by Laplace capillary pressures. In accordance with this definition, it is a requirement for the preparation of a foam that the gas penetrate two separate surfaces before a foam can result. If only one surface has been penetrated, the resulting system is an emulsion.

In the production of the products of the invention only one surface is penetrated and hence the products are more strictly emulsions. It is for this reason that the term "microfoam" is replaced by "microgas emulsion". It is to be understood, however, that this is simply a change in terminology and that there has been no change in the invented product.

According to the invention, there is provided a microgas emulsion behaving like a Newtonian liquid and consisting essentially of a fine dispersion of gas bubbles, substantially all of which are of colloidal dimensions, in a continuous liquid phase containing hydrogen bonds and a soluble emulsifier in an amount sufficient to lower the surface tension of the liquid to a level at which the gas bubbles are stabilised.

The gas bubbles of the microgas emulsion of the invention are substantially all of colloidal dimensions. The term colloidal means that the size of the bubble must be such that the surface forces predominate over other forces such as gravity. Thus, in the microgas emulsion of the invention, the size of the dispersed gas bubbles will be such that the surface forces holding them to the liquid are greater than the upward displacement due to gravity. The actual size of the bubbles will vary according to the type of liquid being used, but it has been found that they are generally 10 microns or less, preferably 1 to 10 microns, in diameter.

Suitable soluble emulsifiers for the practice of the invention include fatty derivatives containing from 1 to 16 carbon atoms in the hydrocarbon chain such as those listed below:

| SURFACE ACTIVE AGENT | HYDROCARBON CHAIN |
|---|---|
| Sodium laurate. $CH_3(CH_2)_{10}COONa$ | $C_{11}H_{23}$ |
| Sodium lauryl sulphate. $CH_3(CH_2)_{11}SO_4Na$ | $C_{12}H_{25}$ |
| Hexadecyl Sulphonic acid $CH_3(CH_2)_{15}SO_3H$ | $C_{16}H_{33}$ |
| Cetyltrimethyl ammonium chloride $CH_3(CH_2)_{15}N(CH_3)_3Cl$ | $C_{16}H_{33}$ |
| Dodecyl pyridinium chloride $C_{12}H_{25}N\ C_5H_5Ce$ | $C_{12}H_{25}$ |
| Sodium dodecyl benzene sulphonate $C_{12}H_{25}C_6H_4SO_3Na$ | $C_{12}H_{25}$ |
| Sodium dioctyl sulphosuccinate $C_8H_{17}OOC\ CH\ SO_3Na$ <br> $\quad\ C_8H_{17}OOCCH_2$ | $(C_8H_{17})_2$ |
| Dodecylamine hydrochloride $CH_3(CH_2)_{11}NH_3Ce$ | $C_{12}H_{25}$ |
| Polyoxyethylene p. tert. octylphenylether $C_8H_{17}C_6H_4O(CH_2CH_2O)_{10}H$ | $C_8H_{17}$ |
| Polyoxyethylene monohexadecyl ether $CH_3(CH_2)_{15}(OCH_2.CH_2)_{21}OH$ | $C_{16}H_{33}$ |

The amount of surface active agent used will vary according to the liquid in which the emulsion is produced, but the amount will generally be in the range 0.001 M to 0.1 M.

The microgas emulsions of the invention have only a limited life and under normal conditions half-lives of up to 5 to 10 minutes are obtainable. The half-life of a microgas emulsion is defined as the time taken for the emulsion to lose half of its entrained gas. Like other emulsions, the first step in breaking is creaming i.e. the rise of the higher bubbles to the upper part of the microgas emulsion.

Any liquid which contains hydrogen bonding is suitable in the production of the microgas emulsions. Examples of such liquids are water, glycol and glycerol.

The microgas emulsions can contain up to 65% by volume of dispersed gas and will generally contain between 20% and 60% by volume of gas.

A particular feature of the microgas emulsions of the invention is that they behave like Newtonian liquids in that they flow immediately any pressure is applied to them. A Newtonian liquid may be defined as a liquid which will exhibit a constant viscosity coefficient over a wide range of applied stress and will be independent of shearing duration or history. Foams, on the other-hand, are not Newtonian liquids.

Other special features of microgas emulsions can best be illustrated by comparison with foams which are also dispersions of gas in a liquid. However, foams are colonies of gas bubbles, each encapsulated in a thin shell of liquid, and held together by Laplace Pressures. The thin shells are stabilised by small amounts of surface active agent, the foaming agent. In general, the volume of gas is considerably larger than that of the liquid, with the consequence that the bubbles of gas are comparatively large, often visible to the eye, and the liquid, usually water, is confined to a thin film separating the encapsulated gas bubbles. This has the effect that foams do not behave as Newtonian liquids and have the same rigidity as a gel, due to the elasticity inherent in the thin liquid film between the bubbles.

However, microgas emulsions have only a single surface between the gas and the liquid, and as the bubbles of gas are spherical with no distortion the flow properties are very close to those of the continuous liquid phase and, therefore, there is very little loss of viscosity. In fact, for microgas emulsions generated in liquids, such as glycerol or glycol where there is considerable hydrogen bonding and therefore a high viscosity the effect of generating the microgas emulsion is to break the continuity of the hydrogen bonding and therefore the microgas emulsion has in fact got a lower viscosity than the continuous liquid phase in which it has been generated.

The microgas emulsions of the invention may be prepared by a novel method which includes the steps of creating a region of low pressure in a flow of liquid and introducing gas bubbles of colloidal dimensions into that region, the liquid containing hydrogen bonding and a soluble emulsifier in an amount sufficient to lower the surface tension of the liquid to a level at which the gas bubbles are stabilised. Preferably, the region of low pressure is created by causing the flow of liquid to pass through a venturi type of channel at sufficient velocity. In order to increase the gas content of the produced emulsion a region of low pressure may be created in a flow of the emulsion and gas bubbles of colloidal dimensions introduced into the region.

When a venturi type of channel is used in the method, the gas bubbles are preferably introduced into the flow at a point of discharge of the flow from the channel.

It has further been observed that cooling enchances the stability of the microgas emulsion and suitable cooling may be achieved in the method of the invention by carrying out some of the steps in a cooling bath.

The simplest apparatus for putting the method into practice is to adapt a common aspirator which is available in most laboratories. The aspirator is so adapted that the inlet and the outlet water tubes almost abut each other, the aperture defined by the space at the junction thereof being minimal. The liquid containing the emulsifier is flowed down the inlet tube, drawing air or other gas into the stream through the small aperture. In such a case it is not necessary to introduce the gas under pressure.

An apparatus suitable for carrying out the method of the invention is illustrated schematically by FIG. 1.

Referring to the FIGURE, there is shown apparatus comprising a tube 10 for carrying a flow of liquid, one end 12 of which is conical-shaped and the other end 14 of which opens into a cylinder 16. The conical end 12 fits into the complementally shaped end 18 of a tube 20 and together the ends 12, 18 define a close fitting joint. The ends 12, 18 are preferably made of coarse ground glass.

A pump 22 is provided in the tube 10 in order to produce a velocity of the liquid sufficient for the formation of a microgas emulsion.

Gas necessary for the formation of a microgas emulsion is introduced under a slight pressure into the chamber 24 from the tube 26.

In use, a liquid as defined above and containing a suitable emulsifier is placed in the cylinder 16 and the pump turned on. This causes the liquid to flow through the tube 10 and out through the end 12. The velocity of the liquid is such that on issuing from the end 12, which defines a venturi type of channel, it draws and entrains gas bubbles of colloidal dimensions from the chamber 24 through the narrow passage 28 defined between the ends 12, 18. Entrainment of these minute gas bubbles in the liquid results in the formation of the microgas emulsion which passes through the tube 20 and into the cylinder 16.

Once all the liquid from the cylinder has been cycled through the apparatus, the pumping may be continued to recycle the formed microgas emulsion and thereby increase the quantity of gas entrained in the liquid. The formed microgas may be drawn off from the cylinder 16 along line 30 by opening the stopcock 32.

With a rate of flow of liquid of between 1 and 10 litres per minute, excellent microgas emulsions have been produced. By way of example, with a rate of flow of 5 litres per minute, a microgas emulsion containing 60% by volume of gas has been produced.

The microgas emulsions of the invention have a number of very useful applications.

Firstly, microgas emulsions have the characteristic flow properties of liquids, but because of the gas entrained are very much lighter than the continuous phase. In fact, they constitute the lightest known mobile liquids at ordinary temperatures. Therefore they will float on other liquids such as hydro-carbons and hence offer a use in fire fighting as they will shield from air any liquid on which they float. This application can be improved because the design of the microgas emulsion generator is such that an inert gas such as carbon dioxide or nitrogen can be incorporated in the microgas emulsion. The mobility of the microgas emulsion will give it an advantage over ordinary foam in fire fighting and it should be possible to design an attachment to the ordinary water supply in laboratories to produce a microgas emulsion as a fire extinguisher. This would be an improvement on the conventional foam generators which are used in laboratories and which are used for fighting off small solvent fires.

The bubbles size in microgas emulsions can be as small as 1 micron in diameter. For this reason there is a very considerable surface area of gas-liquid interface created. Because of this microgas emulsions have a potential for ensuring a quick way of saturating water with gas. It has been calculated that ten microgas emulsion generators each able to process 10 litres of water per minute could entrain enough air to saturate 2 million gallons of water daily. Because of the design of the microgas emulsion generator, it can be attached to an oxygen cylinder and thus oxygen can be directly introduced into any water system.

One of the principal advantages of microgas emulsions lies in the fact that it enables bubbles to be pumped through a pipeline and introduced at any point in a system where the bubbles are needed. This means that aeration of a large bulk of water can be easily effected without handling the bulk of water itself. The application in water purification is obvious. There would also be similar application in microbiological culture systems where the rate determining step is often the supply of oxygen or any other nutrient gas. In chemical processes too, where it is required to introduce a particular gas inside a reactor under controlled conditions, microgas emulsions offer an easy way of doing this. Conversely, the microgas emulsion can be used for removing dissolved gases from liquids, the bubbles saturating quickly and when then grown larger rising to the surface carrying the removed gas.

As it is possible to polymerise around microgas emulsion bubbles, and as in the production of expanded plastics, the bubbles grow at nuclei of bubbles already present, the microgas emulsion could have a useful application in polymerisation, producing an expanded plastic of very uniform bubble size because one of the features of microgas emulsions which is very remarkable is the uniformity of the bubbles when the microfoam is fresh. This can be observed under a microscope.

Microgas emulsions are compressible, thus producing a highly compressible liquid, which is unusual.

It often happens that the viscosity of a liquid is reduced by converting it into a microgas emulsion. This may have distinct advantages in the production of foamed polymers or solid foams.

The microgas emulsions (microfoams) of this invention have been further described by the inventor in an article in Journal of Colloid and Interface Science, 35 643–646 (1971).

I claim:

1. A microgas emulsion consisting essentially of from about 20% to 60% by volume undissolved gas in the form of spherical bubbles of colloidal size distributed in an aqueous liquid containing at least a small but effective amount of a soluble emulsifier to stabilize the emulsion, said emulsion having a viscosity which is not substantially greater than that of the liquid.

2. A microgas emulsion as set forth in claim 1 wherein said bubbles have a diameter of from about 1 to 10 microns.

3. A microgas emulsion as set forth in claim 1 and having a half-life of at least 5 minutes.

4. A microgas emulsion consisting essentially of from about 20% to 60% by volume undissolved gas in the form of spherical bubbles of colloidal size distributed in aqueous liquid containing at least a small but effective amount of a soluble emulsifier to stabilize the emulsion, said emulsion having a viscosity which is not substantially greater than that of the liquid and said emulsion having been made by aspirating said gas into a flowing body of said liquid.

5. A microgas emulsion as set forth in claim 4 wherein said bubbles have a diameter of from about 1 to 10 microns.

6. A microgas emulsion as set forth in claim 4 wherein said emulsion is made by aspirating said gas into said flowing body of said liquid at a venturi through which said flowing body of liquid passes.

7. A method of forming a microgas emulsion from gas and an aqueous liquid containing at least a small but effective amount of a soluble emulsifier to stabilize the emulsion, said method comprising aspirating gas into a flowing body of said aqueous liquid thereby to form an emulsion of said gas in said liquid and aspirating gas into a flowing body of said emulsion thereby to increase the gas content thereof.

8. A method as set forth in claim 7 wherein the flowing body of the emulsion initially formed is cycled to the location where the gas was aspirated into said liquid to form said emulsion at which location the gas is aspirated into said flowing body of said emulsion.

9. A method as set forth in claim 7 wherein the gas aspirated into said flowing body of liquid and into said flowing body of said emulsion is aspirated through apertures of minimal dimensions whereby the gas in said emulsion is caused to be present therein in the form of bubbles of colloidal size.

10. A method as set forth in claim 9 wherein the dimensions of said apertures are such as to cause the gas in said emulsion to be present in the form of bubbles having a diameter of from about 1 to 10 microns.

11. A method as set forth in claim 9 wherein the gas aspirated into said flowing body of liquid and into said flowing body of emulsion is fed to said apertures under pressure.

12. A method as set forth in claim 9 wherein each of said flowing body of liquid and said flowing body of emulsion is caused to flow through a venturi, and wherein said apertures are at the location of a venturi.

* * * * *